United States Patent [19]

White

[11] Patent Number: 4,911,027

[45] Date of Patent: Mar. 27, 1990

[54] METHOD AND APPARATUS FOR OPTICAL FIBER/WIRE PAYOUT SIMULATION

[75] Inventor: James C. White, Decatur, Ala.

[73] Assignee: The Boeing Company, Seattle, Wash.

[21] Appl. No.: 271,945

[22] Filed: Nov. 14, 1988

[51] Int. Cl.$^4$ .............................................. G01L 5/04
[52] U.S. Cl. ................................ 73/865.3; 73/865.6; 73/158
[58] Field of Search ...................... 73/158, 160, 865.6, 73/865.8, 865.9, 865.3, 829, 828

[56] References Cited

U.S. PATENT DOCUMENTS

| | | | |
|---|---|---|---|
| 2,435,266 | 2/1948 | Brillhart | 73/158 |
| 3,330,159 | 7/1967 | Ongaro | 73/865.6 |
| 3,331,251 | 7/1967 | Tibbetts | 73/865.3 |
| 3,913,394 | 10/1975 | Niehaus | 73/118.1 |
| 4,653,331 | 3/1987 | Inouye et al. | 73/865.6 |

Primary Examiner—Robert R. Raevis
Attorney, Agent, or Firm—Finnegan, Henderson, Farabow, Garrett & Dunner

[57] ABSTRACT

A method and apparatus for taking up elongate, flexible communication lines such as wires and optical fibers for simulating the payout of such communication lines from rockets, missiles, aircraft or the like during launch and flight comprising a rotatable flywheel mounted on a base, a rotatable take-up drum having a weight substantially less than the flywheel and having a peripheral winding surface mounted on the same base, a clutch mechanism engageable to render the take-up drum rotatable with the flywheel, a driver source for rotating the flywheel, attaching one end of a communication line to the peripheral winding surface of the take-up drum, rotating the flywheel using the driver source until the desired rotational velocity is attained, and engaging the clutch mechanism to transmit the rotational momentum of the flywheel to the take-up drum in order to impart tangential acceleration and final tangential velocity at the peripheral surface of the take-up drum in a manner simulating the acceleration and velocity of a missile, rocket, aircraft or the like during launch and flight. The method and apparatus of the present invention may be conducted in a chamber or enclosure wherein the atmosphere may be a partial or complete vacuum or a low density gas.

20 Claims, 1 Drawing Sheet

METHOD AND APPARATUS FOR OPTICAL FIBER/WIRE PAYOUT SIMULATION

BACKGROUND OF THE INVENTION

1. Field of the Invention

The present invention is directed generally to a method and apparatus for simulating the paying out of elongate, flexible communication lines from a rocket or missile or other aircraft being launched and flown.

2. Description of Related Art

Many recent weapon and surveillance systems utilize elongate, flexible communication lines in ground to air communication and air to air communication, i.e., between a rocket, missile or aircraft and a ground station or another aircraft. The elongate, flexible communication lines usually comprise wire or optical fibers. Typically, the wire or optical fiber communication lines are uniformly folded or stored on a spool inside the rocket, missile or aircraft and are payed out during take off and flight. The wires or optical fibers are, therefore, frequently subject to high levels of stress from sudden and rapid accelerations and from multiple Mach level payout velocities. The dynamics, mechanics and performance as well as the physical integrity and reliability of the wires or optical fibers are therefore critical for communication with and proper control and operation of the missiles, rockets and aircraft. Thus, a method of simulating the payout of wires or optical fibers in long lengths in a controlled environment where the dynamics, mechanics and performance as well as the physical integrity and reliability of the wires or optical fibers may be experimented with, studied and reliably demonstrated and tested in a cost effective manner was needed.

As a general proposition and from a logistical standpoint, it is difficult to study the payout dynamics, mechanics and performance of wires or optical fibers. It is hardly practical and cost effective to study, measure or conduct experimentation of payout characteristics and patterns of wires or optical fibers during actual launch and flight of missiles, rockets or aircraft. The cost of conducting enough demonstrations and experimentations on particular wires or optical fiber using actual flights to obtain statistically reliable and meaningful data and results would be prohibitively expensive. Furthermore, the technical requirements of such experimentation and demonstration would present a severe logistical burden.

There are several basic guidelines, criteria and preferences for effectively simulating the paying out of wire or optical fiber communication lines from a missile, rocket or aircraft: the payout simulation must be conducted using long lengths of communication lines; the means used for payout simulation must not themselves damage the communication lines in order to properly attribute a cause of damage or distortion of the lines to a payout factor and, also, so that the expensive communication lines may be reused; the payout acceleration and the final payout velocity must accurately reflect the acceleration and velocity during actual missile, rocket or aircraft launch and flight; and the rate of simulated payout acceleration and payout velocity should be controllable and variable.

Early attempts at payout simulation comprised a bow and arrow arrangement whereby the communication line was attached to an arrow and launched from the bow. Although this method illustrates the concept of testing the payout of communication lines, it is wholly unsatisfactory since the acceleration, velocity and range are insufficient and without uniform, accurate and reliable control to provide any meaningful and reliable data and results.

Another method of simulation comprised attachment of a communication line to a rocket sled which was ground fired along a rail. Although this method may have closely simulated the actual aerial launch of a missile or rocket, it was unsatisfactory since the communication line was damaged by contact with the ground and/or the rocket plume. Further, reliable measurement of performance and collection of accurate and meaningful data were not possible due to the short survival period of the communication line due to ground contact and the harsh rocket plume environment. Additionally, the dangerous nature of these tests and experiments dictated that the test sites be confined to remote, desert test sites. Furthermore, the cost of using this method could be hardly less expensive, if not actually more, than using actual aerial missile launches.

Finally, a feeding machine was developed for use in a laboratory environment. In using a feeding machine, the communication line is fed between two high speed pinch rollers in much the same way magnetic tape is fed between pinch rollers in a cassette deck. The feeding machine, however, suffers from several drawbacks. Due to the high peripheral velocity of the pinch rollers, the rollers must be constructed of high strength, light weight metal. The metal rollers cause slippage of the communication line during feeding operations resulting in non-uniform feed rates and unpredictable results. The metal rollers also wear rapidly and also cause rapid wear and damage to the wire or optical fiber. Good control of wire or optical fiber acceleration and velocity with reliably meaningful data and results are therefore difficult to obtain if not impossible to obtain using the pinch roller feeding machine.

Additionally, pinch roller feed machines require close contact by the operator during operation since the wire or optical fiber are manually fed between the spaced rotating rollers. In order to initially begin feeding, manual reduction of the space between the rollers while manually holding the wire or optical fiber between the rollers is necessary until the wire or optical fiber is gripped between the pinch rollers. The chances of limb and life threatening accidents are high due, especially, to the possibility of accidental impact between the rollers which could cause overstress of the rollers resulting in flywheel-like disintegration and due to the possibility of the operator being gripped by the pinch rollers. Another disadvantage of pinch roller feed machines is that there is no method of collecting the wires or optical fibers after they are fed through the machine, and consequently, the wires or optical fibers after exit from the machine are not only non-reusable but also become a hazard for the laboratory environment.

The present invention overcomes the problems and disadvantages of the prior art by providing a novel method and apparatus for simulating the payout of elongate, flexible communication lines. The present invention represents a vast improvement and a completely novel approach for satisfying and meeting the needs, requirements and criteria for effective and useful payout simulation in a safe and cost effective manner.

Additional objects and advantages of the present invention will be set forth, in part, in the description which follows and, in part, will be obvious from the description or may be learned by practice of the invention. The objects and advantages of the invention may be learned by and attained by means of the instrumentalities and combination of steps particularly pointed out in the appending claims.

SUMMARY OF THE INVENTION

To achieve the foregoing objects and in accordance with the purpose of the present invention, as embodied and broadly described herein, the method of simulating the payout of an elongate, flexible communication line such as a wire or optical fiber from a rocket, missile or other aircraft during launch and flight in order to obtain useful and reliable performance data and results and to perform experimentation comprises:

(a) rotating at a predetermined frequency a flywheel having a predetermined rotational inertia;

(b) attaching one end of the communication line to the peripheral surface of a take-up drum having a rotational inertia which is substantially less than the rotational inertia of the flywheel; and (c) engaging a clutch means operatively associated between the flywheel and take-up drum to transmit the rotational momentum of the flywheel to the take-up drum and to impart to the effective peripheral surface of the take-up drum tangential acceleration and final tangential velocity thereby simulating acceleration and velocity of payout of communication line during launch and flight of a rocket, missile, or aircraft.

Preferably, the flywheel rotational frequency or rotational velocity is variably controllable in order to generate varying degrees of rotational momentum. A variable gear or belt assembly between the driver and flywheel and/or a variable speed driver controller may be used to achieve the desired result.

It is also preferable to have means to control the rate of engaging the clutch means in order to control the rate at which the rotational momentum of the flywheel is transferred to the take-up drum so as to be able to control the rate of tangential acceleration of the effective peripheral surface of the take-up drum.

It is also preferable to have means to releasably secure the take-up drum against rotation and means to releasably secure the clutch means against engagement during flywheel acceleration in order to prevent accidental rotation of the take-up drum and accidental engagement between the flywheel and the take-up drum.

It is also preferable to have brake means operatively associated with the flywheel and the take-up drum, either cooperatively or independently, to slow and stop the flywheel and/or the take-up drum during operation. Additional braking power for the flywheel and the take-up drum may be derived by providing means for reversing the drive action of the drive mechanism, i.e., reversing the electrical field in the case of an electric motor drive means.

It is also preferable to alternatively conduct high speed simulation in enclosures or vessels wherein the atmosphere may be partially reduced to a vacuum or may comprise a low density gas such as helium. A vacuum or low density gas atmosphere would reduce aerodynamic drag and diminish the possibility of vibration due to aerodynamic shock on the communication line during high speed simulations. When conducting high speed simulation in enclosures or vessels, the wire or optical fiber may be introduced into the enclosure or vessel and to the machine by way of a passive hole having sealing means in the enclosure or vessel wall.

In further accordance with the purpose of the present invention, as embodied and broadly described herein, a preferred embodiment of an apparatus for simulating the payout of an elongate, flexible communication line from a rocket, missile or aircraft during launch and flight in order to obtain useful and reliable performance data and results and to perform experimentation comprises:

a base;

a flywheel having a predetermined rotational inertia rotatably mounted on the base;

means operatively associated with the flywheel for selectively rotating the flywheel to a predetermined rotational frequency;

a take-up drum having a rotational inertia substantially less than the flywheel rotatably mounted on the base, the take-up drum having a predetermined diameter and a peripheral surface for windingly receiving the communication line;

means for engaging an end of the communication line to the peripheral surface of the take-up drum; and clutch means operatively associated between the flywheel and take-up drum to selectively and drivingly transmit the rotational momentum of the flywheel to the take-up drum and to impart to the effective peripheral surface of the take-up drum tangential acceleration and final tangential velocity, thereby simulating acceleration and velocity of payout of the communication line during launch and flight of a rocket, missile or aircraft.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Reference will now be made, in detail, to a preferred embodiment of the present invention, an example of which is illustrated in the accompanying drawings and is represented generally by the numeral 10. Whenever possible, the same reference numbers will be used throughout the drawings to refer to the same or like parts.

Figure 1:
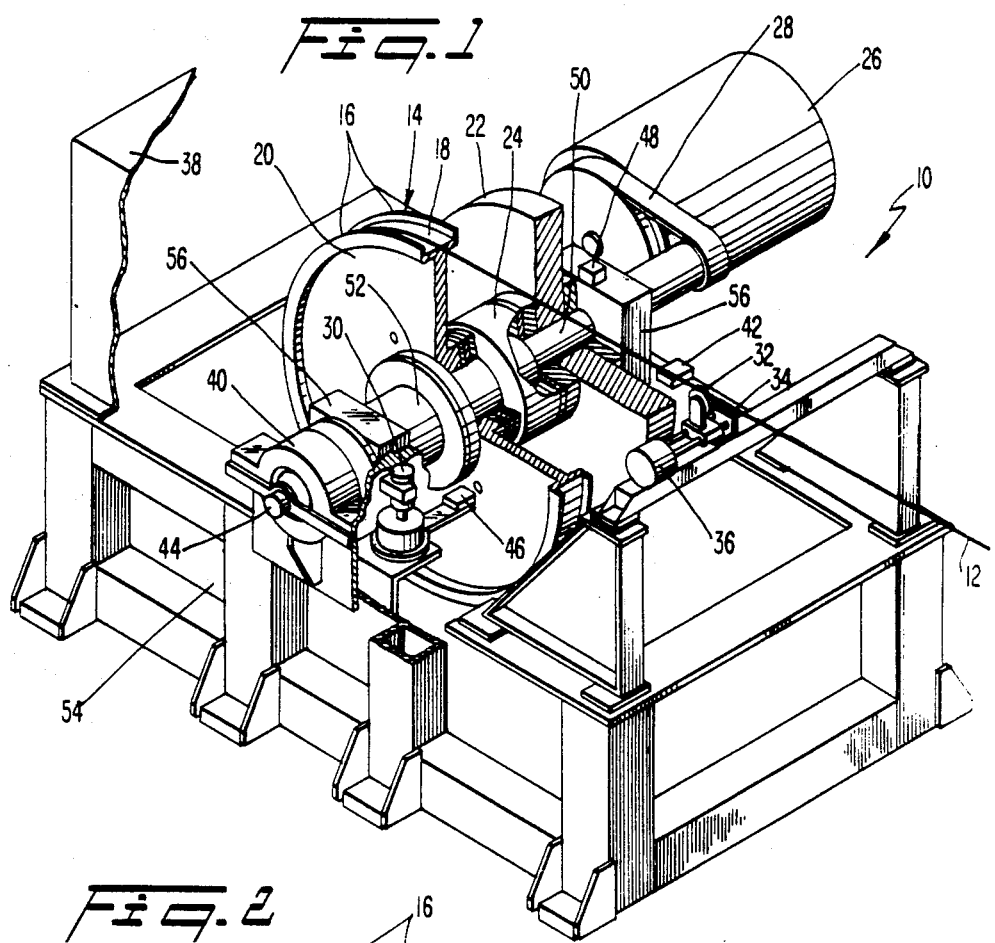
FIG. 1 is a perspective partial cutaway view of an embodiment of the apparatus of the invention.

Referring to FIG. 1 and in accordance with the invention, it may be seen that a flywheel 22 is rotatably mounted on base 54 by shaft means 50. The flywheel 22 is sized and weighted to have significantly more rotational inertia than the take-up drum 14. Since the rotational momentum of the flywheel 22 is used for imparting rotational force to the take-up drum 14 at a desired rate of rotational acceleration until the desired rotational frequency or rotational velocity of the take-up drum 14 is attained, the size and weight of the flywheel 22 depends, in part, on the desired rate of rotational acceleration and the desired final rotational velocity of the take-up drum 14. The desired rate of rotational acceleration and final rotational velocity of the take-up drum is determined by determining the desired rate of tangential acceleration and final tangential velocity at the effective peripheral surface of the take-up drum. The size and weight of the flywheel 22 is also determined, in part, by the materials with which the flywheel 22 is made as well as the composition pattern throughout the flywheel 22, i.e., density and strength of the materials used and the density pattern throughout the flywheel 22.

The flywheel 22 is desirably made of metal or a metal composite which is capable of withstanding high centrifugal forces for extended periods of time without losing physical integrity, i.e., without deformation, fragmentation and/or splintering.

The shape and configuration of the flywheel is determined, in part, by aerodynamic factors. For example, at rotational frequencies of approximately 3,500 RPM, air friction against the flywheel has the potential of causing excessive vibration and instability. The shape and configuration of the flywheel is also determined, in part, by factors relating to the mechanical dynamics of the flywheel. For example, at any rotational velocity, an improperly balanced flywheel has the potential of causing excessive vibration and instability.

Figure 2:
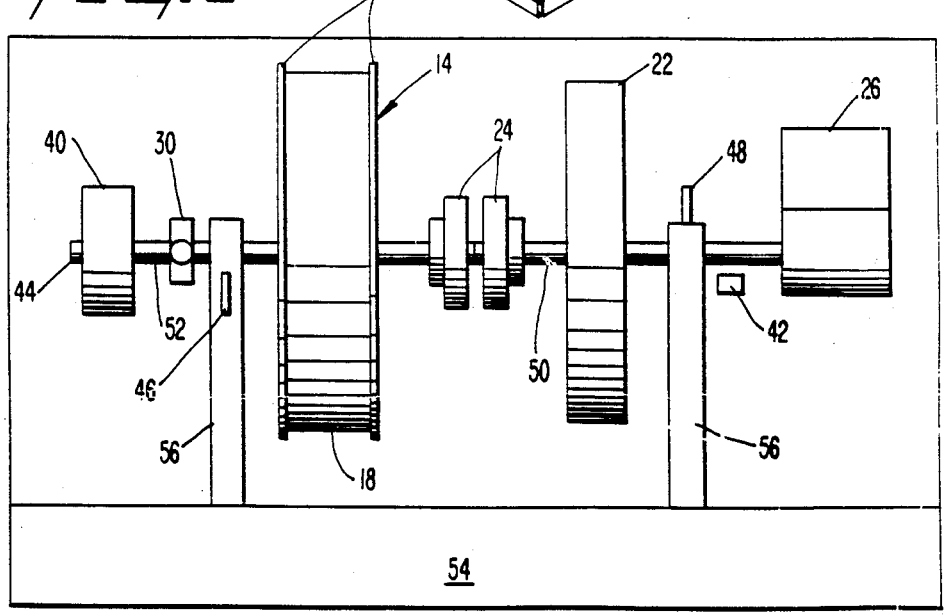
FIG. 2 is a front, elevational schematic view thereof.

The apparatus of the invention further comprises a take-up drum 14 which is also rotatably mounted on base 54 by shaft means 52. As embodied herein and depicted in FIGS. 1 and 2, the take-up drum 14 is integrally mounted on shaft means 52. The take-up drum 14 is sized according to the type of communication line 12 being studied and tested taking into consideration the physical properties and characteristics of the communication line. For example, optical fibers, due to their physical and optical properties, may require a take-up drum having a certain minimum diameter in order to avoid excessive optical attenuation or physical damage during winding on the take-up drum. In the case of metallic wires such as copper wires, however, the diameter of the take-up drum may be altered more freely as the physical properties of metallic wires allow for a higher degree of adaptability.

The configuration of the take-up drum 14 is dictated by several factors including aerodynamic, structural and mechanical dynamic considerations. Cylindrical configurations are preferred though not required. The peripheral line winding surface 18 of the take-up drum 14 may be a cylindrical planar surface which is normal to the plane of the supporting body 20 of the take-up drum 14. The width of the winding surface is variable, and is dependent, in part, on the length of fiber to be deployed. It is desirable to have guides 16 on the sides of the peripheral line winding surface 18 to aid in retaining and guiding the communication line 12 on the winding surface 18 of the take-up drum 14 during winding operations.

The size of the take-up drum 14 may also be dependent on the anticipated rotational frequency which may be experienced during actual simulation. For example, for a given line winding speed, as the diameter of the take-up drum is increased, the rotational frequency necessary to maintain the given line winding speed decreases. Similarly, as the diameter of the take-up drum is decreased, the rotational frequency must be increased to maintain the given line winding speed.

The flywheel shaft 50 and take-up drum shaft 52 are mounted and supported by bearing packed supports 56. The supports 56 are integral to the base 54. Shaft means 50 and 52 are operatively associated and independently rotatable relative to each other. Shaft means 50 and 52 are operatively associated by clutch means 24. In the preferred embodiment, the clutch means 24 comprises an electromagnetic clutch. Accordingly, the rate and pattern of clutch engagement may be controlled using an electrical power regulating device (not shown) to effect continuous uniform electromagnetic power or varying degrees of electromagnetic power. Said electrical current regulating device may also comprise a lock feature (not shown) to prevent power to the electromagnetic clutch 24 by accident.

The apparatus of the invention also comprises means operatively associated with the flywheel 22 for selectively rotating the take-up drum 14. As depicted in FIG. 1, a drive means 26 comprising an electric motor is mounted on the base 24 and operatively associated with flywheel shaft means 50 by drive belt 28. The drive means 26 may, alternatively, be operatively associated with flywheel shaft means 50 by direct drive. Alternatively, remote drive means may be utilized by using additional drive belts or a system of mechanical gears. The power output capacity of the drive means 26 should be sufficient to overcome aerodynamic drag during flywheel rotation so as to establish and maintain a desired flywheel rotational frequency. It is to be noted that a considerable amount of power generated by the drive means can be used to overcome aerodynamic drag experienced by the flywheel, and in some cases, over 50% of the power generated by the drive means may be consumed by aerodynamic drag. As an example, an electrical motor having a 75 horsepower output rating would be sufficient to establish and maintain a rotational frequency of approximately 3,000 RPM in the case of a disc-shaped flywheel having a diameter of approximately 1 meter and a weight of approximately 450 Kg.

Take-up drum shaft means 52 is operatively associated with brake means 40. In the preferred embodiment, brake means 40 comprises an electromagnetic brake. Accordingly, the rate of engagement of the electromagnetic brake means may be controlled using an electrical power regulating device.

Take-up drum shaft means 52 is also operatively associated with lock means 30. A hole or cavity (not shown) whose axis is normal to the central axis of the shaft is provided for on the shaft 52 at the juncture with the lock means 30. The lock means 30 comprises a solenoid and plunger device having a bolt which engages and locks the shaft 52 by intimate engagement with the hole or cavity provided in the shaft 52. A remote electrical switch (not shown) is used to activate the lock means 30 to releaseably secure said take-up drum shaft means 52 against rotation prior to conducting payout simulation. The lock means 30 may, however, alternatively comprise a manually operated locking device comprising either a shaft clamping assembly, a lock and bolt assembly or another mechanical lock, although the risk of bodily injury renders remote operation preferred over direct manual operation.

Speed sensors 44, 46, 48 are placed in strategic locations in order to monitor, regulate and coordinate the various components of the device during simulation. In the preferred embodiment, the speed sensors comprise magnetic pickups or optical encoders. Speed sensor 44 is provided adjacent brake means 40 to monitor and sense the rotational frequency of the take-up drum shaft 52. Another speed sensor 46 is provided near the take-up drum 14 to monitor and sense the rotational frequency of said take-up drum. Speed sensor 48 is provided near the flywheel 22 to monitor and sense the rotational frequency of said flywheel. The signals produced by the speed sensors are fed to meters and/or control means (not shown).

Shaft vibration sensor 42 is provided near flywheel shaft means 50 in order to sense unacceptable levels of vibration from said flywheel shaft which would be indicative of mechanical failure. In the preferred embodiment, the shaft vibration sensor 42 comprises a strain gauge or a piezoelectric transducer. The signals produced by the shaft vibration sensor 42 are fed to meters and/or control means (not shown). If unacceptable levels of vibration are detected, the simulation may be stopped, either manually by the operator by remote or direct operation or automatically by a computerized machine control unit (not shown).

The control means referred to in the above, including all of the electrical current regulating devices, may be integrated into a computerized machine control unit (not shown). With the use of a computerized machine control unit, the signals from the speed and vibration sensors can be monitored and processed by the computer for proper determination and regulation of the electrical current to the electromagnetic devices in accordance with the desired rate of take-up drum rotational acceleration and rotational velocity as well as the desired rate of braking force.

In accordance with the invention, the method of simulating the payout of a communication line comprises attachment of one end of a wire or optical fiber communication line 12 on the peripheral winding surface 18 of the take-up drum 14 using engagement or attachment means (not shown) on said peripheral winding surface. Attachment of one end of a wire or optical fiber communication line on the peripheral surface of the take-up drum may also be made by bonding. With the lock 30 in the disengaged position, the communication line 12 is manually wound around the take-up drum 14 to remove any slack while being aligned and placed on pulley guide 32. The pulley guide 32 is mounted on a level winding screw 34 which is turned by a controllable motor 36. The purpose of the pulley guide 32, winding screw 34, and motor 36 assembly is to provide means for guidingly engaging and reciprocally translating the communication line 12 from one side of the peripheral winding surface 18 of the take-up drum 14 to the other side in a back and forth pattern prior to contact with the take-up drum 14 to evenly and uniformly wind the line around the take-up drum 14 during winding operation. Even and uniform winding of the line 12 around the take-up drum 14 allows smooth winding patterns precluding undue vibration associated with irregular winding paths and, therefore, aids in simulating the smooth payout patterns of actual aerial launches. Additionally, even and uniform winding of the line around the take-up drum helps to minimize undue wear and damage to the communication line and therefore greatly adds to the reusable lifetime of the costly communication lines.

The frequency of the side-to-side action of the pulley guide 32 as mounted on the winding screw 34 is controlled by the motor 36 which is controlled by electrical power control means (not shown), for example, a digital controlled stepping motor. The factors which determine the frequency of the side-to-side action of the pulley guide 32 include the diameter of the take-up drum, the rotational frequency of the take-up drum, and the diameter of the communication line. The electrical current control means for said motor 36 may be integrated within said computerized machine control unit to provide accurate numeric control over the frequency of the pulley guide 32 side-to-side action as a function of the diameter of the take-up drum, the rotational frequency of the take-up drum, and the diameter of the communication line. The diameter of the communication line 12 is a constant parameter which may be entered directly into the computerized machine control unit. The diameter of the take-up drum, however, does not remain a constant value as the communication line 12 is wound by the take-up drum 14, and therefore, the initial diameter of the take-up drum 14 is entered into the computerized machine control unit. Thereafter, the increasing diameter of the take-up drum is computed by adding a factor, i.e., the diameter of the communication line, after each layer of line is wound on the take-up drum 14. Thus the effective peripheral surface of the take-up drum increases after each layer of line is wound on the take-up drum. It should be noted, however, that as the diameter of the take-up drum increases, the effect of increasing diameter and increasing effective peripheral surface becomes nominal until it is nearly negligible. The rotational frequency of the take-up drum 14 is monitored by speed sensor 46, and the signal generated thereby is routed to a meter and/or the aforementioned computerized control unit.

The drive means 26 comprising an electric motor is operatively engaged with shaft means 50 by drive belt 28 and is used to impart rotational force on flywheel 22. Flywheel rotational frequency is monitored by speed sensor 48. When the desired flywheel rotational velocity is attained, i.e, the desired flywheel rotational momentum is attained, the lock 30 is disengaged from take-up drum shaft means 52, and the clutch means 24 is engaged.

The rate of clutch engagement is controlled and is determined by the desired acceleration rate that is being tested on the wire or optical fiber 12. A high rate of acceleration would require a high rate of clutch engagement and, in the context of the preferred embodiment which utilizes an electromagnetic clutch, would have a high electrical power requirement.

The take-up drum 14 is accelerated to the desired rotational velocity while winding the communication line 12 around its effective peripheral winding surface 18. This acceleration of the take-up drum is the simulation of rocket, missile or aircraft acceleration during launch, and performance data is collected during this time. When the desired final tangential velocity is attained at the effective peripheral surface 18, the tangential velocity is maintained at the effective peripheral surface 18 while further data is collected on the performance and characteristics of the communication line. This relatively constant tangential velocity at the effective peripheral surface 18 of the take-up drum is the simulation of rocket, missile or aircraft flight or cruising speed.

If vibration from flywheel shaft 50 exceeds acceptable limits-an indication of mechanical failure-sensor 42 sends a signal to a meter and/or the aforementioned computerized machine controller unit. The computerized machine controller unit or an operator electrically engages electromagnetic brake 40 and either cuts power or reverses the electrical field to electrical motor 26, depending on the level of braking power called for. In the case of an emergency, brake 40 may be fully engaged while the electrical field to the electrical motor 26 is reversed with full power for maximum braking effect.

When simulation is complete and requires termination, braking force is applied to take-up drum shaft 52 by brake 40. The clutch 24 may be disengaged if it is desired to maintain rotational velocity of the flywheel, but usually the clutch is not disengaged since termination of flywheel rotation adds to safety during manual handling in between successive simulations. The electrical field to the electrical motor 26 may be reversed for additional braking force.

Upon completion of payout simulation, the communication line may be rewound onto a spool or another take-up drum for re-use during further simulation trials.

As previously noted, aerodynamic drag on the flywheel can consume a large amount of power generated by the drive means. Further, aerodynamic drag can cause excessive vibration and instability of the flywheel and of the apparatus of the present invention as a whole. Accordingly, in order to reduce or eliminate these negative effects of aerodynamic drag, in another embodiment of the present invention, the method and apparatus of the present invention may be conducted in a chamber or a vessel 38 wherein the atmosphere may be partially or completely reduced to a vacuum or may comprise a low density gas such as helium. The vacuum or low density gas atmosphere would reduce the aerodynamic drag not only on the flywheel but also on the communication line. The result would be a reduction or elimination of vibration and drag on the flywheel and diminishing or elimination of vibration of the communication line caused by aerodynamic shock during winding operation. The communication line may be introduced into the chamber or vessel 38 and to the take-up drum 14 by way of a passive hole (not shown) having sealing means (not shown) in the wall of the chamber or vessel 38. It will be apparent to those skilled in the art that various modifications and variations can be made in the method and apparatus of the present invention without departing from the scope or spirit of the invention. As an example, there can be more than one take-up drum provided permitting payout simulation of more than one line at one time. Analogously, there can be more than one flywheel provided to permit the development of greater rotational momentum which can be imparted on the take-up drum. Further, there can be more than one drive means provided permitting faster acceleration of the flywheel and thus less time loss before the desired flywheel rotational velocity is attained. Thus, it is intended that the present invention cover the modifications and variations of this invention provided they come within the scope of the appended claims and their equivalents.

What is claimed is:

1. A method of simulating payout of an elongate, flexible communication line from a rocket, missile or aircraft during launch and flight, the method comprising:

attaching one end of the communication line to the peripheral surface of a take-up drum having a rotational inertia which is substantially less than the rotational inertia of the flywheel;

rotating at a predetermined frequency a flywheel having a predetermined rotational inertia; and engaging a clutch means operatively associated between said flywheel and take-up drum to transmit the rotational momentum of said flywheel to said take-up drum and to impart to the effective peripheral surface of said take-up drum tangential acceleration and final tangential velocity thereby simulating acceleration and velocity of payout of said communication line during launch and flight of a rocket, or missile or aircraft.

2. The method as claimed in claim 1 further including the step of controlling the rate of engaging said clutch means to selectively control said tangential acceleration of said effective peripheral surface of said take-up drum.

3. The method as claimed in claim 1 further including the steps of guidingly engaging and reciprocally translating said communication line prior to contact with said take-up drum to evenly wind said line on the effective peripheral surface of said take-up drum.

4. The method as claimed in claim 1 further including the steps of releasably securing said take-up drum against rotation prior to engaging said clutch means and releasing said take-up drum for rotation prior to engaging said clutch means.

5. The method as claimed in claim 1 further including the step of stopping the rotation of said take-up drum by disengaging said clutch means and selectively engaging a brake means operatively associated with said take-up drum.

6. The method as claimed in claim 1 further including the step of stopping the rotation of said take-up drum by engaging a brake means operatively associated with said take-up drum and simultaneously slowing rotation of said flywheel.

7. The method as claimed in claim 1 further including the steps of sensing the rotational frequency of said flywheel and said take-up drum and stopping the rotation thereof if the rotational frequency of said flywheel or said take-up drum exceeds a predetermined maximum.

8. The method as claimed in claim 1 further comprising conducting said method in a chamber.

9. The method as claimed in claim 8 wherein the atmosphere within said chamber comprises a partial vacuum, a complete vacuum or a low density gas.

10. The method as claimed in claim 1 further including the steps of sensing the rotational frequency of said flywheel and said take-up drum and controlling the rotation frequency thereof by the combination of selectively engaging a brake means operatively associated with said take-up drum and selectively engaging said clutch means.

11. The method as claimed in claim 1 further including the steps of sensing vibration generated by said flywheel and said take-up drum and stopping the rotation thereof if said vibration exceeds a predetermined level.

12. An apparatus for simulating pay out of an elongate, flexible communication line from a missile, rocket or aircraft during launch and flight, the apparatus comprising:

a base;

a flywheel having a predetermined rotational inertia rotatably mounted on said base;

means operatively associated with said flywheel for selectively rotating said flywheel to a predetermined rotational frequency;

a take-up drum having a rotational inertia substantially less than said flywheel rotatably mounted on said base, said take-up drum having a predetermined diameter and a peripheral surface for windingly receiving said communication line;

means for engaging an end of said communication line to said peripheral surface of said take-up drum; and clutch means operatively associated between said flywheel and said take-up drum to selectively, drivingly transmit rotational momentum of said flywheel to said take-up drum and to impart to the effective peripheral surface of said take-up drum tangential acceleration and final tangential velocity, thereby simulating acceleration and velocity of payout of said communication line during launch and flight of a rocket, missile or aircraft.

13. The apparatus as claimed in claim 12 further comprising means for controlling the rate of engaging said clutch means to selectively control the rate of said tangential acceleration of said effective peripheral surface of said take-up drum.

14. The apparatus as claimed in claim 12 further comprising means for guidingly engaging and reciprocally translating said communication line prior to contact with said take-up drum to evenly wind said line on the effective peripheral surface of said take-up drum.

15. The apparatus as claimed in claim 12 further comprising lock means for releasably securing said take-up drum against rotation prior to engaging said clutch means.

16. The apparatus as claimed in claim 12 further comprising brake means operatively associated with said take-up drum.

17. The apparatus as claimed in claim 12 further comprising speed sensors for sensing the rotational frequency of said flywheel and said take-up drum.

18. The apparatus as claimed in claim 12 further comprising a vibration sensor for sensing vibrations generated by said flywheel and take-up drum.

19. The apparatus as claimed in claim 12 further comprising a chamber, integral to said base, for enclosing said flywheel, said means for selectively rotating said flywheel, said take-up drum, and said clutch means.

20. The apparatus as claimed in claim 19 wherein the atmosphere within said chamber comprises a partial vacuum, a complete vacuum or a low density gas.

* * * * *

UNITED STATES PATENT AND TRADEMARK OFFICE
CERTIFICATE OF CORRECTION

PATENT NO. : 4,911,027
DATED : March 27, 1990
INVENTOR(S) : James C. White

It is certified that error appears in the above-identified patent and that said Letters Patent is hereby corrected as shown below:

IN THE SPECIFICATION:

Colum 8, line 38, change "determmed" to --determined--; and
line 60, change "limits-an" to --limits _ an --;
change "failure-sensor" tô --failure _ sensor--.

Signed and Sealed this

Second Day of April, 1991

Attest:

HARRY F. MANBECK, JR.

Attesting Officer

Commissioner of Patents and Trademarks